(12) United States Patent
Kawabata et al.

(10) Patent No.: US 7,709,123 B2
(45) Date of Patent: May 4, 2010

(54) FILM ELECTRODE ASSEMBLY FOR FUEL CELL, POLYMER ELECTROLYTIC CELL FOR FUEL CELL AND METHOD FOR MANUFACTURING POLYMER ELECTROLYTIC FUEL CELL AND FILM ELECTRODE ASSEMBLY

(75) Inventors: Norihiko Kawabata, Osaka (JP); Hiroki Kusakabe, Osaka (JP); Takashi Morimoto, Osaka (JP); Toshihiro Matsumoto, Osaka (JP); Masatoshi Teranishi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/096,842

(22) PCT Filed: Jun. 14, 2007

(86) PCT No.: PCT/JP2007/062034

§ 371 (c)(1),
(2), (4) Date: Jun. 10, 2008

(87) PCT Pub. No.: WO2007/145291

PCT Pub. Date: Dec. 21, 2007

(65) Prior Publication Data

US 2009/0246586 A1 Oct. 1, 2009

(30) Foreign Application Priority Data

Jun. 16, 2006 (JP) .............................. 2006-167221

(51) Int. Cl.
*H01M 8/10* (2006.01)
*H01M 2/08* (2006.01)
*H01M 2/14* (2006.01)

(52) U.S. Cl. .............................. 429/30; 429/35; 429/36; 429/38

(58) Field of Classification Search ................... 429/30, 429/35, 36, 38
See application file for complete search history.

(56) References Cited

U.S. PATENT DOCUMENTS

2004/0209148 A1 10/2004 Ohara et al.
(Continued)

FOREIGN PATENT DOCUMENTS

JP 2001-155745 6/2001
(Continued)

OTHER PUBLICATIONS

International Search Report issued Oct. 2, 2007 in the International (PCT) Application of which the present application is the U.S. National Stage.

*Primary Examiner*—Jerry Lorengo
*Assistant Examiner*—Eli Mekhlin
(74) *Attorney, Agent, or Firm*—Wenderoth, Lind & Ponack, L.L.P.

(57) ABSTRACT

There is provided a film electrode assembly for a fuel cell capable of preventing a polymer electrolyte film from being exposed. The film electrode assembly includes: a main body portion of a film electrode assembly having a polymer electrolyte film, and a pair of electrode layers having catalyst layers placed on the two surfaces of the polymer electrolyte film on the inner side from the peripheral edge portion thereof and diffusion layers each having a peripheral edge protruding from the catalyst layer, which are laminated on one another, with a gap being formed between the protruding portion of the diffusion layer and the peripheral edge portion of the polymer electrolyte film; a frame member that sandwiches the peripheral edge portion of the polymer electrolyte film between the paired electrode layers with a gap therebetween, and is formed so as to surround an outer edge of the polymer electrolyte film; and gaskets made of a thermoplastic resin, which are placed on the two surfaces of the frame member. Each gasket includes an annular portion that covers the peripheral edge portion of the main body portion of the film electrode assembly over the entire circumference thereof along the inner edge of the frame member and a gap filling portion that fills the gap.

9 Claims, 8 Drawing Sheets

U.S. PATENT DOCUMENTS

| | | |
|---|---|---|
| 2004/0234831 A1 | 11/2004 | Kobayashi et al. |
| 2007/0264557 A1* | 11/2007 | Kobayashi et al. ............ 429/36 |
| 2009/0136811 A1* | 5/2009 | Kusakabe et al. ............ 429/30 |

FOREIGN PATENT DOCUMENTS

| | | |
|---|---|---|
| JP | 3368907 | 1/2003 |
| JP | 2003-068319 | 3/2003 |
| JP | 2004172096 A * | 6/2004 |
| JP | 2004-303723 | 10/2004 |
| JP | 2004-319461 | 11/2004 |
| JP | 2006-310288 | 11/2006 |
| JP | 2006-339120 | 12/2006 |
| WO | 2006/040994 | 4/2006 |

* cited by examiner

FILM ELECTRODE ASSEMBLY FOR FUEL CELL, POLYMER ELECTROLYTIC CELL FOR FUEL CELL AND METHOD FOR MANUFACTURING POLYMER ELECTROLYTIC FUEL CELL AND FILM ELECTRODE ASSEMBLY

TECHNICAL FIELD

The present invention relates to a film electrode assembly used for a fuel cell, a method for manufacturing such a film electrode assembly and a polymer electrolytic fuel cell. In particular, the present invention relates to a film electrode assembly having a gasket joined to a peripheral edge portion of a main body portion of the film electrode assembly, a cell used for a polymer electrolytic fuel cell, and a method for manufacturing such polymer electrolytic fuel cell and film electrode assembly.

BACKGROUND ART

A polymer electrolytic fuel cell (hereinafter referred to as PEFC) is a device which generates power and heat simultaneously by allowing a fuel gas containing hydrogen and an oxidant gas such as air containing oxygen to electrochemically react with each other.

In general, the PEFC is configured by laminating cells. A single cell is formed by sandwiching a film electrode assembly by using a pair of plate-shaped conductive separators, more specifically, an anode separator and a cathode separator. The film electrode assembly is provided with a main body portion of the film electrode assembly and a frame member that extends along the peripheral edge portion of the main body portion of the film electrode assembly to be placed thereon, in such a manner as to surround the main body portion of the film electrode assembly. The main body of the film electrode assembly is constituted by a polymer electrolyte film and a pair of electrode layers formed on the two surfaces thereof. Thus, a fuel gas and an oxidant gas are allowed to contact the two surfaces of the electrode layers to cause an electrochemical reaction. On the other hand, the frame member has a gasket, and the gap between the gasket and the separators is sealed, so that the fuel gas and the oxidant gas are prevented or restrained from leaking outside.

For example, the fuel cells having this structure are disclosed in Japanese Unexamined Patent Publication No. 2001-155745 and Japanese Patent No. 3368907. The fuel cell disclosed in Japanese Unexamined Patent Publication No. 2001-155745 relates to a gasket that is molded so as to cover the end face of a main body portion of a film electrode assembly and seal the end face. However, with this gasket, time-consuming tasks are required to place a sealing material that is made in close contact with the peripheral edge portion of the electrode layer just enough and evenly, with the result that this method is not suitable for mass production. Moreover, since the end face of the electrode layer of the main body portion of the film electrode assembly is covered with the gasket, the end face portion covered with the gasket fails to contribute to power generation, resulting in degradation in efficiency.

For this reason, by placing the gasket such that it does not cover the end portion of the electrode of the main body portion of the film electrode assembly, the entire face of the electrode layer can be used for power generation with this gasket. Japanese Patent No. 3368907 discloses a film electrode assembly shown in FIG. 3 thereof, which is provided with a gap between the electrode layer and the gasket (gas sealing member).

DISCLOSURE OF THE INVENTION

Problems to be Solved by the Invention

In the film electrode assembly disclosed in FIG. 3 of Patent No. 3368907, however, the polymer electrolyte film forming the main body portion of the film electrode assembly is exposed to the surface from the gap. It is disclosed that when the polymer electrolyte film is exposed to the surface, the electrolyte film is torn by a pressure difference between the fuel gas and the oxidant gas, with the result that the gas sealing property is lost. For this reason, Japanese Patent No. 3368907 has proposed to place a sheet-shaped protective layer onto the portion to which the polymer electrolyte film is exposed.

However, it is difficult from the viewpoint of production to place the protective layer up to the peripheral edge of the electrode layer without gaps on the surface of the polymer electrolyte film, and it is placed with one portion thereof being inserted into the lower side of the electrode layer (see FIG. 2 of Japanese Patent No. 3368907). By placing the protective layer in this manner, the strength of the polymer electrolyte film is improved; however, portions where the polymer electrolyte film and the electrode layer do not directly contact each other fail to contribute to power generation, resulting in a failure in improving the power generating efficiency.

In order to solve these problems, the applicant of the present invention has disclosed in a previously filed application (No. Japanese Patent Application No. 2005-105742, not yet published) a gasket structure which has an annular portion formed into substantially an annular shape along the inner edge of a frame member and an extending portion that is formed in an elongated manner from the annular portion so as to be joined to the side face of the electrode layer, after passing over the inner edge portion of the frame member and the peripheral edge portion of the polymer electrolyte film from the annular portion. As shown in FIG. 6(d) in the application, this structure prevents the polymer electrolyte film from being exposed to the surface, so that the above-mentioned problem can be solved.

However, the electrode layer is normally formed not into a single-layer structure, but into a multi-layer structure in which a catalyst layer, a C-layer and a gas diffusion layer are laminated on the polymer electrolyte film. In order to effectively use the catalyst layer, the gas diffusion layer is normally made larger than the catalyst layer, and placed in such a manner as to protrude from the peripheral edge of the catalyst layer. Moreover, the side face of the electrode layer is not made flush because of the protruding portion of the gas diffusion layer, and actually, that portion is not covered with the gasket, with the polymer electrolyte film being exposed thereto. The fuel gas and oxidant gas that have permeated through the diffusion layer enter the gap located below the protruding portion of the diffusion layer, and tend to cause leakage of the fuel gas and oxidant gas through the gap.

Therefore, in order to solve the above-mentioned issues, the technical subject to be achieved by the present invention is to provide a film electrode assembly for a fuel cell which can prevent exposure of a polymer electrolyte film, a polymer electrolytic cell used for a fuel cell and a method for manufacturing such polymer electrolytic fuel cell and film electrode assembly.

Means for Solving the Problems

In order to achieve the above-mentioned object, the present invention includes the following arrangements.

According to a first aspect of the present invention, there is provided a film electrode assembly for a fuel cell comprising:

a main body portion of the film electrode assembly having a polymer electrolyte film and a pair of electrode layers, each pair of electrode layers being formed in a center area inside a peripheral edge portion of each of two surfaces of the polymer electrolyte film, each pair of electrode layers having a catalyst layer and a diffusion layer laminated, the diffusion layer having an area larger than that of the catalyst layer with a peripheral edge protruding from the catalyst layer, a gap being formed between the protruding portion of the diffusion layer and the peripheral edge portion of the polymer electrolyte film;

a frame member that sandwiches the peripheral edge portion of the polymer electrolyte film with a gap formed between the paired electrode layers, and is made of a plate-shaped thermoplastic resin in such a manner as to surround an outer edge of the polymer electrolyte film; and a gasket formed on each of the two faces of the frame member, the gasket being made of a thermoplastic resin, wherein the gasket includes an annular portion that is placed along an inner edge of the frame member, and covers the gap from the inner edge of the frame member, a rib formed on the annular portion and extending along the inner edge of the frame member, and a gap filling portion for filling the gap between the protruding portion of the diffusion layer and the peripheral edge portion of the polymer electrolyte film.

According to a second aspect of the present invention, there is provided the film electrode assembly for a fuel cell according to the first aspect, wherein the position where the elongated rib is formed along the inner edge of the frame member is located on an inner side from an outer peripheral end of the polymer electrolyte film sandwiched by the frame member.

According to a third aspect of the present invention, there is provided the film electrode assembly for a fuel cell according to the first aspect, wherein the protruding portion of the diffusion layer has a protrusion width smaller than the thickness width of the diffusion layer.

According to a fourth aspect of the present invention, there is provided the film electrode assembly for a fuel cell according to the first aspect, wherein, in the diffusion layer, an end face of the protruding portion is formed into a tapered shape in a direction in which the catalyst layer side is shortened.

According to a fifth aspect of the present invention, there is provided the film electrode assembly for a fuel cell according to the first aspect, wherein the electrode layers, each formed on the two surfaces of the polymer electrolyte film, are placed at positions shifted from each other on the front surface and back surface, with the positions of the gaps being different in the front surface direction and back surface direction.

According to a sixth aspect of the present invention, there is provided the film electrode assembly for a fuel cell according to the first aspect, wherein the frame member includes a pair of manifold holes for respectively supplying a fuel gas and an oxidant gas to the main body portion of the film electrode assembly, and the annular portions of the gasket are placed on the peripheral portions of the pair of the manifold holes.

According to a seventh aspect of the present invention, there is provided a polymer electrolytic fuel cell comprising:

a film electrode assembly of claim 1; and an anode separator and a cathode separator, each being placed to sandwich the film electrode assembly, wherein the anode separator and the cathode separator are formed such that annular-portion contacting portions to be in contact with annular portions formed on the periphery of the main body portion of the film electrode assembly are formed into the same shapes as those of the outer shapes of the annular portions, and no gap is formed between the annular portions and the annular-portion contacting portions.

According to a eighth aspect of the present invention, there is provided the polymer electrolytic fuel cell comprising more than one laminated polymer electrolytic fuel cells of the seventh aspect.

According to a ninth aspect of the present invention, there is provided a method for manufacturing a film electrode assembly comprising:

forming catalyst layers on two surfaces of a polymer electrolyte film on an inner side from a peripheral edge portion of the polymer electrolyte film, and placing a diffusion layer on each of the surfaces of the catalyst layer in a laminated state, the diffusion layer having an area larger than the catalyst layer with a peripheral edge protruding from the catalyst layer, to manufacture a main body portion of the film electrode assembly with a gap being formed between the protruding portion of the diffusion layer and the peripheral edge portion of the polymer electrolyte film;

forming a molded member having a frame shape with a flat portion formed on a frame inner edge, by pouring a thermoplastic resin between a first mold and a second mold;

coupling a third mold to the first mold to which the molded member is fitted, the molded member having the main body portion of the film electrode assembly placed inside the frame of the molded member, such that the peripheral edge portion of the main body portion of the film electrode assembly is positioned on the flat portion, and pouring a thermoplastic resin between the first mold and the third mold to mold a frame member to which the main body portion of the film electrode assembly is joined;

coupling a fourth mold and a fifth mold to each other while sandwiching the frame member to which the main body portion of the film electrode assembly is joined therebetween, and pouring a fused resin between the fourth mold and the fifth mold to mold a gasket, the gasket including an annular portion that is formed along the inner edge of the frame member and covers the frame member from the inner edge of the frame member to the outer edge of the diffusion layer, a rib that is provided on the annular portion and extends along the inner edge of the frame member, and a gap filling portion to fill the gap between the protruding portion of the diffusion layer and the peripheral edge portion of the polymer electrolyte film.

EFFECTS OF THE INVENTION

In accordance with the present invention, since an annular portion, which is placed along the inner edge of a frame member so as to cover a portion from the inner edge of the frame member to the outer edge of a diffusion layer, is provided, no gap is formed between the frame member and the diffusion layer. Moreover, since the annular portion is placed from the inner edge of the frame member to the outer edge of the diffusion layer without covering the diffusion layer, the surface area of the diffusion layer that can be made in contact with a fuel gas and an oxidant gas is not decreased, so that the power generating efficiency can be maintained at a high level.

Moreover, since a gap filling portion to be injected into a gap between the diffusion layer and the polymer electrolyte film is formed, the fuel gas and the oxidant gas, sent from the frame member side, are prevented from passing through the diffusion layer to flow into the gap to the polymer electrolyte film from the protruding portion of the diffusion layer, so that it becomes possible to prevent these gases from making a shortcut without contacting the catalyst layer.

Therefore, the fuel utilization rate can be improved, and the power generating process can be carried out stably. Moreover, by forming a rib on the top face of the annular portion, the hermetic property between the film electrode assembly and the separators can be enhanced.

Furthermore, the rib formed on the top face of the annular portion makes it possible to enhance the hermetic property between the separators and the respective electrode assemblies. Also, the position for the rib formation is set to the inner side from the peripheral edge of the polymer electrolyte film, so that it becomes possible to prevent the frame member from pressing the polymer electrolyte film due to pressure applied to the rib in combining it with the separators to cause the fuel gas or the oxidant gas to make a shortcut toward the opposing side face through the gap between the polymer electrolyte film and the frame member.

BRIEF DESCRIPTION OF THE DRAWINGS

These and other aspects and features of the present invention will become clear from the following description taken in conjunction with the preferred embodiments thereof with reference to the accompanying drawings, in which.

BEST MODE FOR CARRYING OUT THE INVENTION

Figure 1:
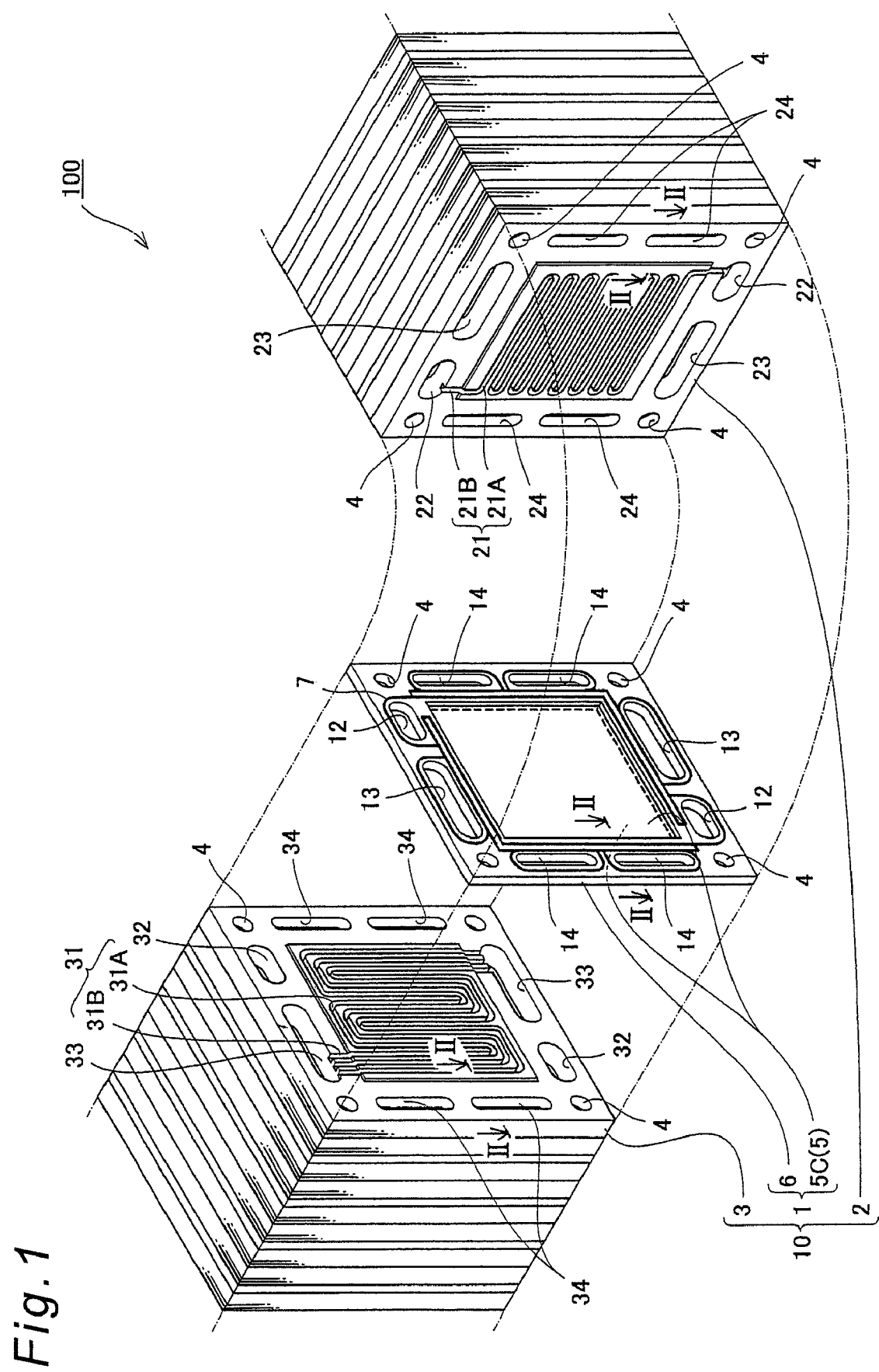
FIG. 1 is a partially exploded perspective view schematically showing a polymer electrolytic fuel cell in accordance with one embodiment of the present invention.

Before the description of the present invention proceeds, it is to be noted that like parts are designated by like reference numerals throughout the accompanying drawings. Referring to the drawings, a first embodiment according to the present invention will be described below in detail.

FIG. 1 is an exploded perspective view schematically showing one portion of a structure of a polymer electrolytic fuel cell in accordance with a first embodiment of the present invention.

As shown in FIG. 1, a polymer electrolytic fuel cell (PEFC) 100 is constituted by laminated layers of cells 10. Although not shown, a collector plate, an insulating plate and an end plate are attached to the outermost layer of each of the two ends of the cells 10, and the cells 10 are fastened to one another from the two ends by tightening bolts inserted through bolt holes 4 and nuts (both of which are not shown). In the present embodiment, sixty cells 10 are laminated on one another, and fastened by the bolts inserted through the bolt holes 4 and the nuts with fastening force of 10 kN.

Each cell 10 has a structure in which a frame member 6 formed on the peripheral edge portions of two surfaces of a film electrode assembly 1, more exactly, a gasket 7, is sandwiched by a pair of conductive separators, more specifically, an anode separator 2 and a cathode separator 3. With this arrangement, a diffusion layer 5C (see FIG. 2), which is placed on the outermost side of an electrode layer of the main body portion 5 of the film electrode assembly, is made in contact with the surfaces of the separators 2 and 3, so that a diffusion layer contact portion 21A of a fuel gas flow passage groove 21 of the anode separator 2, as well as a diffusion layer contact portion 31A of an oxidant gas flow passage groove 31 of the cathode separator 3, and the diffusion layer 5C define a fuel gas flow passage and an oxidant gas flow passage. Thus, a fuel gas flowing through the diffusion layer contact portion 21A contacts the diffusion layer 5C on the separator 2 side at the anode to cause an electrochemical reaction of the PEFC 100. Moreover, in the laminated cells 10, the adjacent film electrode assembly main portions 5 are electrically connected in series with one another, or in parallel with one another.

Respective pairs of through holes through which a fuel gas and an oxidant gas are allowed to flow, that is, fuel gas manifold holes 12, 22 and 32 and oxidant manifold holes 13, 23 and 33, are formed on the peripheral edge portions of the separators 2 and 3 and of the film electrode assembly 1, that is, on the frame member 6. In a laminated state of the cells 10, these through holes are stacked to form fuel gas manifolds and oxidant manifolds.

Moreover, on the main face inside the anode separator, the fuel gas flow passage groove 21 is formed in such a manner as to connect the paired fuel gas manifold holes 22 with each other. On the main face inside the cathode separator 3, the oxidant gas flow passage groove 31 is formed in such a manner as to connect the paired oxidant gas manifold holes 33 with each other. That is, this structure is designed so that the oxidant gas and the fuel gas are branched from the respective ones of manifolds, that is, from the manifolds on the supply side, into the passage grooves 21 and 31 and allowed to respectively communicate with the other manifolds, that is, the manifolds on the discharge side.

Thus, in the assembled state of the cells 10, the fuel gas flow passage groove 21 is constructed to have the diffusion layer contact portion 21A formed on the surface in contact with the diffusion layer 5C and a pair of communicating portions (communicating passage grooves) 21B that are formed to be located between the surface in contact with the diffusion layer 5C and the surface opposing to the peripheral portion of the diffusion layer 5C. In the same manner, in the assembled state of the cells 10, the passage groove 31 is constructed to have the diffusion layer contact portion 31A formed on the surface in contact with the diffusion layer 5C and a pair of communicating portions (communicating passage grooves) 31B that are formed to be located between the surface in contact with the diffusion layer 5C and the surface opposing to the peripheral portion of the diffusion layer 5C. In this case, the communicating portions 21B and 31B are formed so as to respectively connect the paired manifold holes 22 and 33 with the diffusion layer contact portions 21A and 31A. With this arrangement, the oxidant gas and the fuel gas are respectively branched and flow into the communicating portions 21B and 31B from the fuel gas manifold hole 22 and the oxidant gas manifold hole 33 on the supply side, and contact the diffusion layer 5C at the respective diffusion layer contact portions 21A and 31A, so that an electrochemical reaction takes place. Then, resulting excessive gases and reaction product components are discharged to the fuel gas manifold hole 22 and oxidant gas manifold hole 33 on the discharge side via the communicating portions 21B and 31B respectively connected to the fuel gas manifold hole 22 and the oxidant gas manifold hole 33 on the discharge side.

The gaskets 7 are placed on the main faces on the two sides of the frame member 6 of the film electrode assembly 1. The gaskets 7 are placed so that the oxidant gas and the fuel gas are not allowed to flow from the predetermined flow passages 21 and 31 to the outside of the flow passages 21 and 31. That is, the gaskets 7 are formed in such a manner as to surround the peripheral portions of the manifold holes 12, 13 and 14 and the peripheral portion of the frame. Moreover, on the anode separator 2 side in the assembled state of the cells 10, no gasket 7 is placed at a position to be in contact with the communicating portion 21B of the fuel gas flow passage groove 21, while the gasket 7 is placed in such a manner as to integrally surround the fuel gas manifold hole 12 and the main body portion 5 of the film electrode assembly. In the same manner, on the cathode separator 3 side in the assembled state of the cells 10, no gasket 7 is placed at a position to be in contact with the communicating portion 31B of the oxidant gas flow passage groove 31; thus, the gaskets 7 cause no blockage to the fuel gas flowing between the oxidant gas manifold hole 13 and the main body portion 5 of the film electrode assembly as well as to the oxidant gas flowing between the oxidant gas manifold hole 33 and the main body portion 5 of the film electrode assembly, and the gaskets 7 make it possible to prevent leakage of the gases from the fuel gas flow passage 21 and the oxidant gas flow passage 31. It should be noted that in FIG. 1, for convenience of explanation, with respect to the winding structures of the gaskets 7 and the flow passage grooves 21 and 31 of the diffusion layer contact portions 21A and 31A of the separators 2 and 3, only schematic structures thereof are shown.

It should be noted that the manifolds may be prepared as so-called external manifolds. In the case where the structure of the external manifolds is adopted, none of the fuel gas manifold holes 12, 22 and 32 and the oxidant gas manifold holes 13, 23 and 33 are formed in the film electrode assembly 1 and the separators 2 and 3, with the communicating portions 21B and 31B of the fuel gas flow passage groove 21 and the oxidant gas flow passage groove 31 being extended to the end faces of the respective separators 2 and 3. Then, pipes, which respectively supply the fuel gas and oxidant gas, are branched and joined to the end faces of the respective separators 2 and 3. In the case of the external manifolds, the gaskets 7 are placed in such a manner as to be extended to the end faces of the frame member 6 along the peripheral portions of the communicating portions 21B and 31B of the fuel gas flow passage groove 21 and the oxidant gas flow passage groove 31.

Moreover, in the same manner as in the fuel gas manifold holes 12, 22, 32 and the oxidant gas manifold holes 13, 23, 33, water manifold holes 14, 24 and 34, which form two pairs of manifolds through which cooling water flows, are formed on the peripheral edge portions of the separators 2, 3 and the film electrode assembly 1. With this arrangement, in the assembled state of the cells 10, these manifold holes are respectively stacked to form the two pairs of water manifolds.

Figure 2:
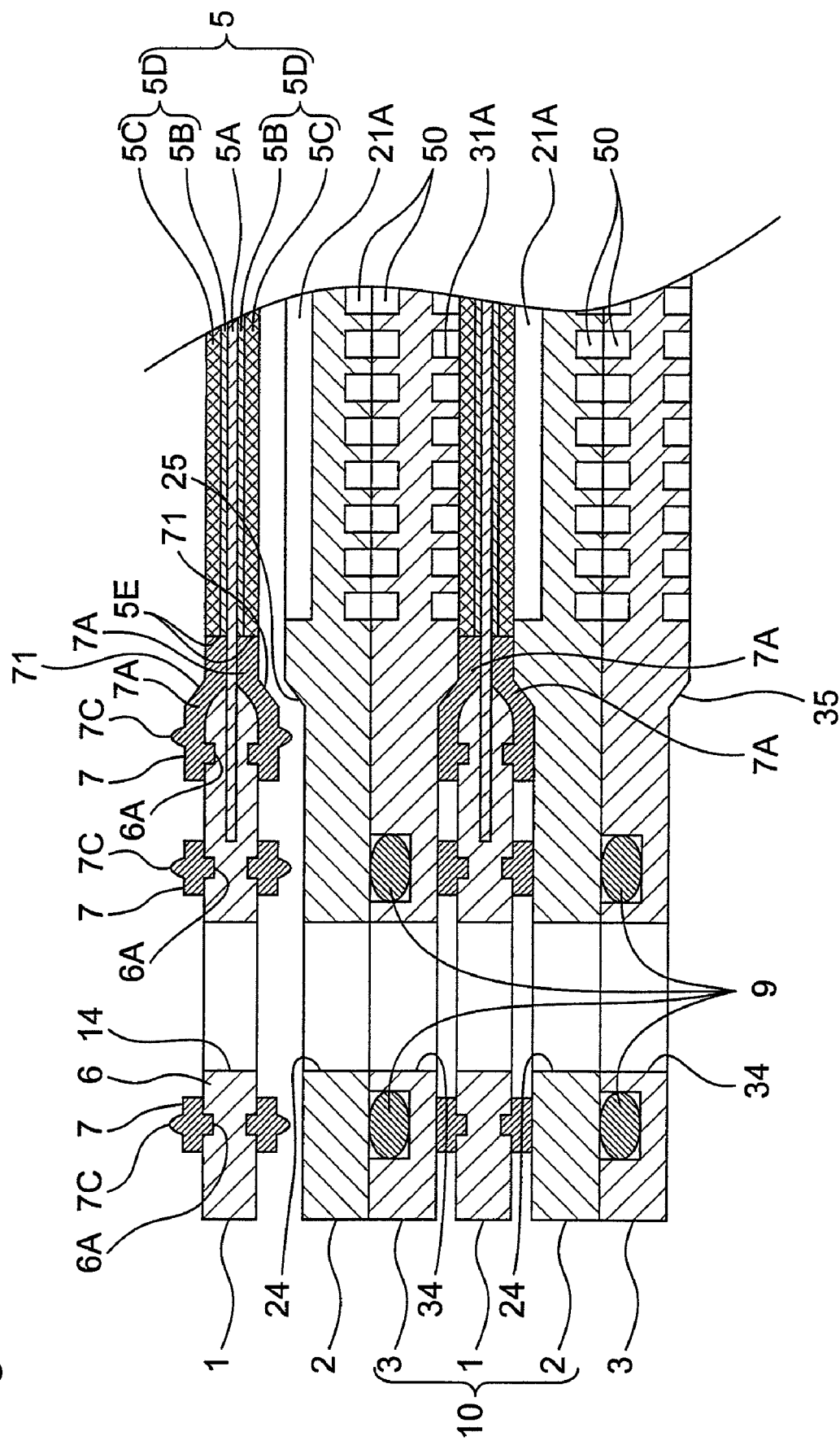
FIG. 2 is a partially exploded cross-sectional view showing a cross section of cell laminated layers on a cross section taken along the line II-II of FIG. 1.

FIG. 2 is a partially exploded cross-sectional view showing a cross section of cell laminated layers on a cross section taken along the line II-II of FIG. 1. The main body portion 5 of the film electrode assembly is constituted by a polymer electrolyte film 5A that selectively transports hydrogen ions and a pair of electrode layers 5D formed on the two faces of the polymer electrolyte film 5A, that is, anode and cathode electrode layers. The electrode layer 5D has a two-layer structure of a catalyst layer 5B and a diffusion layer 5C. Normally, this catalyst layer 5B, which is mainly composed of carbon powder on which a platinum metal catalyst is supported, is formed on a surface of the polymer electrolyte film 5A. The diffusion layer 5C, which is formed on the outer face of the catalyst layer 5B, has both of a ventilating property and an electron conductive property. It should be noted that the catalyst layer 5B may have a two-layer structure including a C layer and a platinum carbon layer which are not shown.

Figure 5A:
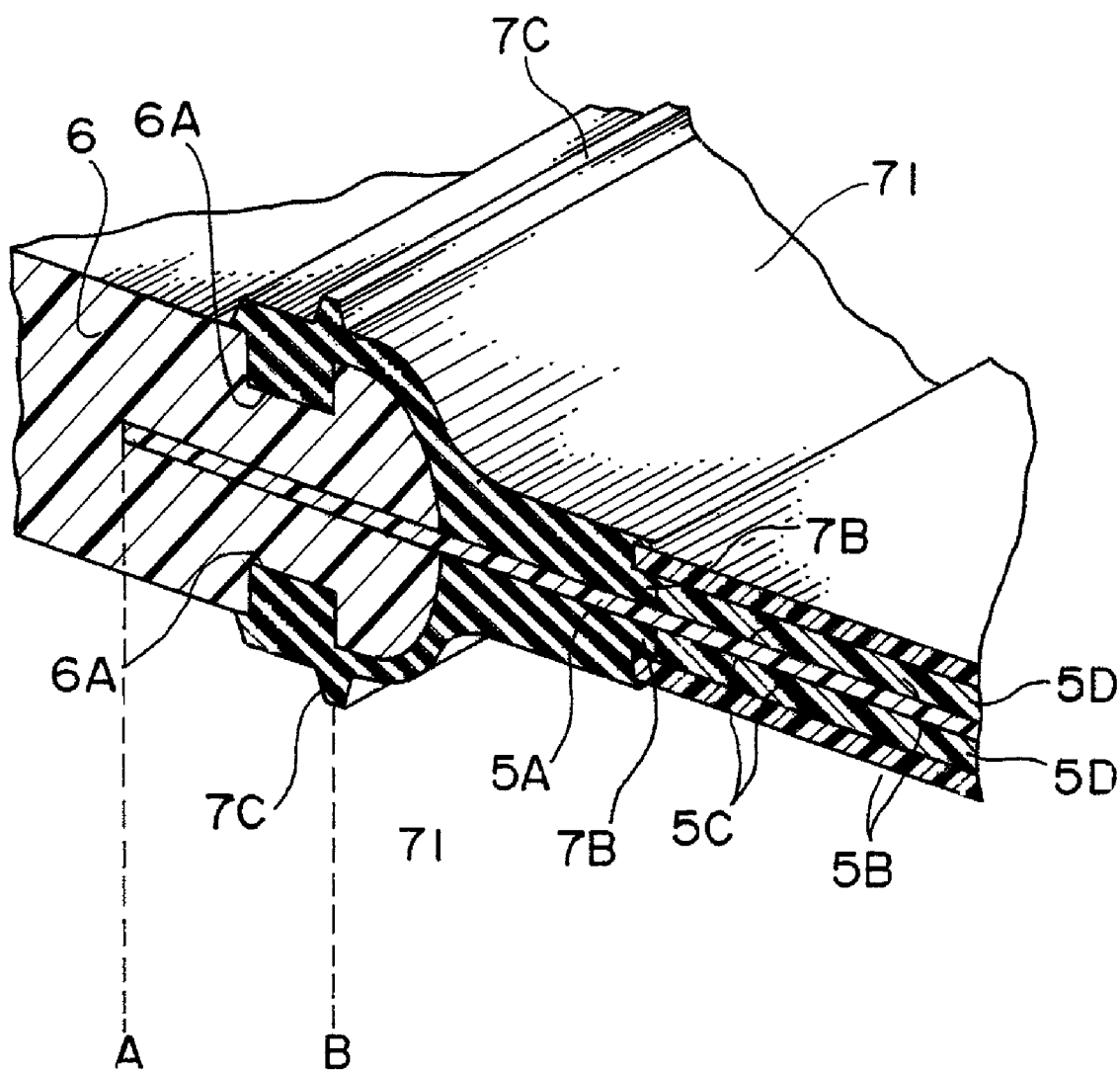
FIG. 5A is a perspective cross-sectional view showing a border portion between a gasket of the film electrode assembly and an electrode layer.

Moreover, the diffusion layer 5C is formed so as to protrude from the peripheral edge of the catalyst layer 5B (see FIG. 5A). The reason why the diffusion layer 5C is formed so as to protrude from the catalyst layer 5B is that the fuel gas or the oxidant gas needs to be spread over the entire surface of the catalyst layer 5B. That is, since the diffusion layer 5C is normally made larger than the catalyst layer 5B, the entire surface of the catalyst layer 5B can be made in contact with the diffusion layer 5C, so that the fuel gas or the oxidant gas can be spread over the entire surface of the catalyst layer 5B.

The anode separator 2 and the cathode separator 3, each having a flat plate shape, are provided with step differences 25 and 35 on the faces in contact with the film electrode assembly 1, that is, on the inner faces, such that each of the center portions is protruded into a trapezoidal shape by following the shape of the film electrode assembly 1, more specifically, the step difference caused by a difference in thickness between the frame member 6 and the main body portion 5 of the film electrode assembly. The anode separator 2 and the cathode separator 3 herein are made of glassy carbon (3 mm in thickness) manufactured by Tokai Carbon Co., Ltd. In the separators 2 and 3, various manifold holes 22, 23, 2, 32, 33, 34, and bolt holes 4 are formed so as to penetrate in the thickness direction of the separators 2 and 3.

Moreover, on the inner faces of the separators 2 and 3, the fuel gas flow passage groove 21 and the oxidant gas flow passage 31 are formed, and on the back faces of the separators 2 and 3, water flow passage grooves 50 are formed. The various manifold holes 22, 23, 24, 32, 33, 34, the bolt holes 4, the fuel gas flow passage groove 31, the water flow passage groove 50 and the like are formed through cutting processes or molding processes.

The water flow passage grooves 50 are formed so as to connect the two pairs of the water manifold holes 24 and 34 with each other. That is, the arrangement is made such that water is branched from one of the manifolds, that is, from the manifold on the supply side toward the water flow passage grooves 50, and allowed to flow into the other manifold, that is, the manifold on the drain side. With this arrangement, the cells 10 can be maintained at a predetermined temperature suitable for the electrochemical reaction by the heat transmitting capability of water. It should be noted that in the same manner as for the fuel gas and in the oxidant gas, the water manifold holes 14, 24 and 34 may not be formed on the separators 2 and 3 and the peripheral edge of the film electrode assembly 1, and cooling supply/discharge passages may have external manifold structures. Moreover, without forming water flow passage grooves 51 on the back faces of the separators 2 and 3, the cells 10 may be stacked, with a cooling unit through which cooling water is circulated being inserted between the adjacent cells.

The gasket 7, which is made of an elastic member, is deformed when the film electrode assembly 1 and the separators 2 and 3 are pressed thereon, so that the peripheral portion of the main body portion 5 of the film electrode assembly and the peripheral portion of the manifold hole 14 are sealed. It should be noted that, with respect to the fuel gas manifold hole 12 and the oxidant manifold hole 13 also, the peripheral portion of each of the manifold holes is sealed with the gasket 7 in the same manner. Moreover, on the periphery of the main body portion 5 of the film electrode assembly, a peripheral gap 40 is formed between the main body portion of the film electrode assembly and the electrode layer 5D. As will be described later, the gasket 7 also seals this peripheral gap 40 of the main body portion of the film electrode assembly.

A groove portion 6A is formed on a portion along which an annular portion 7A of the gasket 7 is placed, on each of the surfaces of the frame member 6, and the annular portion 7A is formed in such a manner as to bury the groove portion 6A. The joining property between the gasket 7 and the frame member 6 can be improved by this groove portion 6A.

The frame member 6 is made of a thermoplastic resin. This thermoplastic resin is chemically clean and stable at an operating temperature of the PEFC 100 or less, and has an appropriate elastic modulus and a comparatively high deflection temperature under load. For example, in the case where the fuel gas flow passage 21 and the oxidant gas flow passage 31 of the separators 2 and 3 have a width of about 1 to 2 mm, with the thickness of the frame member 6 being set to about 1 mm or less, the compression modulus of the frame member 6 is preferably set to at least 2000 MPa or more. The elastic modulus here refers to a compression modulus measured by a compression modulus measuring method defined by JIS-K7181. Also, since the operating temperature of the PEFC 100 is generally 90° or less, the deflection temperature under load of the frame member 6 is preferably set to 120° or more. Moreover, from the viewpoint of the chemical stability, the frame member 6 is preferably made of not an amorphous resin but of a crystalline resin, and among such resins, one having a greater mechanical strength and high heat resistance is preferably used. For example, those of a so-called super engineering plastic grade are preferably used, and examples thereof include polyphenylene sulfide (PPS), polyether ether ketone (PEEK) and crystalline polymer (LCP) polyether nitrile (PEN). These materials have a compression modulus in a range from several thousands to several tens of thousands MPa, and a deflection temperature under load of 150° C. or higher, and are preferably used. Moreover, among generally-used resin materials, for example, glass filler-filled polypropylene (GFPP) has an elastic modulus that is several times higher than that of non-filled polypropylene (compression modulus: 1000 to 1500 MPa) and a deflection temperature under load near 150°, and is preferably used. In the present embodiment, glass-filler added PPS (DIC-PPS FZ1140-B2: manufactured by Dainippon Ink & Chemicals, Incorporated), which is a thermoplastic resin, is used.

Moreover, the gasket 7 is made of a thermoplastic resin or a thermoplastic elastomer. This thermoplastic resin or thermoplastic elastomer is chemically stable under operating conditions of the PEFC 100, and has such a hot water resistance that no hydrolysis is caused. For example, the compression modulus of the gasket 7 is preferably set to 200 MPa or less. The preferable example of the material is selected from the group comprising polyethylene, polypropylene, polybutylene, polystyrene, polyvinyl chloride, polyvinylidene chloride, polyvinyl alcohol, polyacrylamide, polyamide, polycarbonate, polyacetal, polyurethane, silicone, fluororesin, polybutylene terephthalate, polyethylene terephthalate, syndiotactic polystyrene, polyphenylene sulfide, polyether ether ketone, polysulfone, polyether sulfone, polyallylate, polyamideimide, polyetherimide, and thermoplastic polyimide. Thus, it becomes possible to ensure a desirable sealing property under fastening load of the PEFC 100. In the present embodiment, Santprene 8101-55 (manufactured by Advanced Elastomer System) which is a polyolefin-based thermoplastic elastomer is used.

A general-use sealing member 9, such as a squeezed packing made of a heat-resistant material, is placed on the periphery of each of the various manifold holes on the back faces of the anode separator 2 and cathode separator 3. With this arrangement, it becomes possible to prevent leakage of the fuel gas, the oxidant gas and water from the linked portions of the various manifold holes 22, 23, 24, 32, 33 and 34 between the adjacent cells 10.

Figure 3:
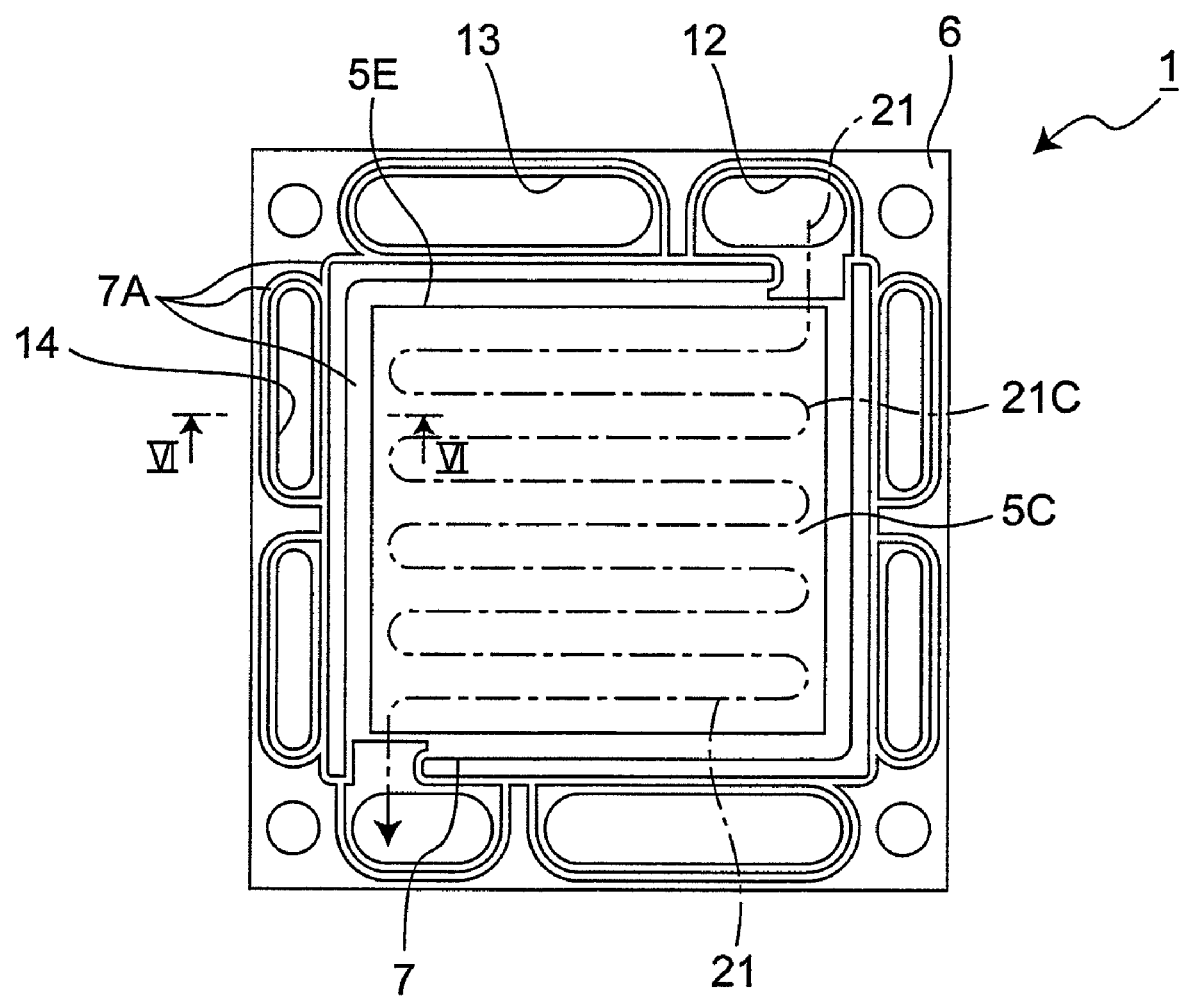
FIG. 3 is a plan view showing a surface structure of a film electrode assembly of FIG. 1 on an anode separator side.
Figure 4:
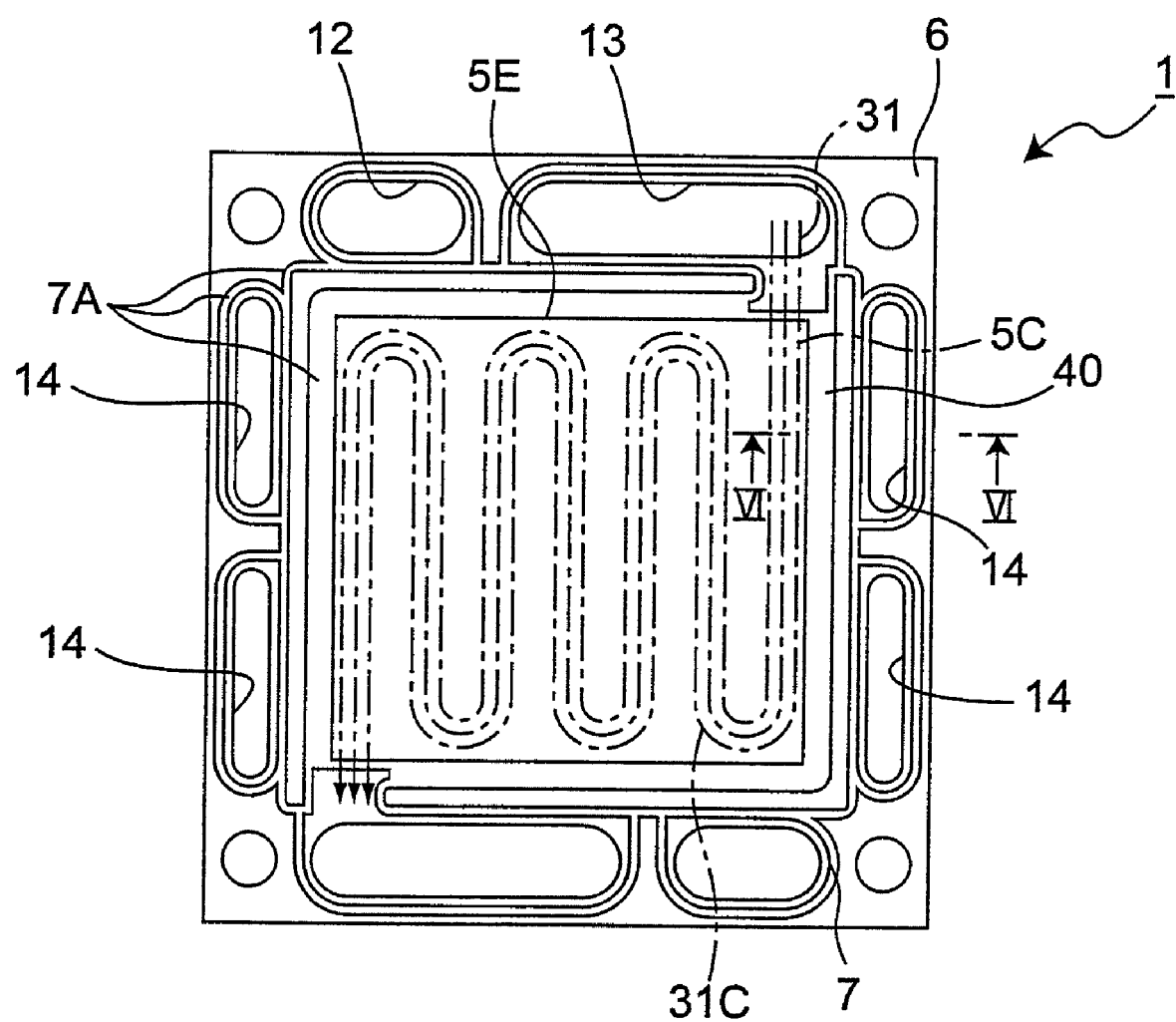
FIG. 4 is a plan view showing a surface structure of the film electrode assembly of FIG. 1 on a cathode separator side.

FIG. 3 is a plan view showing a surface structure of a film electrode assembly of FIG. 1 on the anode separator side, and FIG. 4 is a plan view showing a surface structure of the film electrode assembly of FIG. 1 on the cathode separator side. In the two figures, alternate long and short dash lines indicate positions where the fuel gas flow passage 21 and the oxidant gas flow passage 31 of the anode separator 2 and the cathode separator 3 are brought into contact with, or made opposite to each other in the assembled state of the cells 10.

As shown in FIG. 3 and FIG. 4, the film electrode assembly 1 of the present embodiment has a structure in which the frame member 6 is placed on the peripheral edge portion of the main body portion 5 of the film electrode assembly, with the gasket 7 being placed over each of the two main faces of the frame member and the peripheral edge portion 5E of the polymer electrolyte film 5A.

The frame member 6 is a frame member having a rectangular shape, which sandwiches the polymer electrolyte film 5A of the main body portion 5 of the film electrode assembly (see FIG. 2), and is joined to the outer peripheral edge of the polymer electrolyte film 5A. As described earlier, the frame member 6 is provided with a pair of fuel gas manifold holes 12, a pair of oxidant manifold holes 13, two pairs of water manifold holes 14 and four bolt holes 4 near the corners of the frame member 6, which are formed so as to penetrate the frame member in the thickness direction. In the present embodiment, the frame member 6 is made in a rectangular flat plate having a dimension of 200 mm×180 mm in the outer shape and a dimension of 124 mm in square in the opening 26. Moreover, the thickness of the frame member 6 is 0.8 mm.

The gasket 7 is provided with annular portions 7A that surround the pair of the fuel gas manifold holes 12, the pair of the oxidant gas manifold holes 13 and the two pairs of the water manifold holes 14, and also surround the diffusion layer 5C of the main body portion 5 of the film electrode assembly. As shown in FIG. 3, on the anode separator 2 side, the annular portions 7A are formed so as to integrally surround the fuel gas manifold holes 12 and the main body portion 5 of the film electrode assembly, and as shown in FIG. 4, on the cathode separator 3 side, the annular portions 7A are formed so as to surround the oxidant gas manifold holes 13 and the main body portion 5 of the film electrode assembly. With this arrangement, the fuel gas and the oxidant gas are blocked from flowing out of the fuel gas flow passage groove 21 and the oxidant gas low passage groove 31. In this case, the annular portions 7A of the gasket 7 cause flow passage resistance at the communicating portions 21B and 31B of the fuel gas flow passage groove 21 and the oxidant gas flow passage groove 31; however, since the annular portions 7A that contact the communicating portions 21B and 31B are placed at positions where the step differences 25 and 35 of the respective separators 2 and 3 are formed, and since the depths of the grooves formed in the respective separators 2 and 3 are sufficiently provided, the annular portions do not become an obstacle in the flow passages of the fuel gas and the oxidant gas. It should be noted that in the assembled state of the cells 10, the annular portions 7A of the gasket 7 need not be formed at positions to be in contact with the communicating portions 21B and 31B of the fuel gas flow passage groove 21 and the oxidant gas flow passage groove 31. In this case, the flow passage resistance of the communicating portions 21B and 31B of the fuel gas flow passage groove 21 and the oxidant gas flow passage groove 31 can be further reduced.

FIG. 5A is a perspective cross-sectional view showing a border portion between a gasket and an electrode layer of the film electrode assembly. Between the annular portions 7A and the electrode layers 5D of the main portion 5 of the film electrode assembly, the step differences 25 and 35 of the separators 2 and 3 are formed so as to provide a closely contacting state without gap.

As described above, the annular portions 7A of the gasket 7 are formed into an annular shape so as to cover the peripheral edge portion 5E along the inner edge of the frame member 6 on each of the main faces of the frame member 6, and the surfaces 71 of the annular portions 7A are formed in such a manner as to follow the step differences 25 and 35 of the anode separator 2 and the cathode separator 3; thus, this structure is made so that, when the film electrode assembly and the separators 2 and 3 are combined with one another, no gaps are formed between the surfaces of the annular portions and the surfaces of the separators 2 and 3.

Moreover, as described above, the portion at which the diffusion layer 5C protrudes from the peripheral edge of the catalyst layer 5B forms a gap relative to the polymer electrolyte film 5A. A gap filling portion 7B of the gasket 7 is also formed in this gap, as will be described later.

By forming the annular portions 7A in this manner to completely seal the peripheral gap 40 of the main body portion of the film electrode assembly, that is, the gap between the frame member 6 and the electrode layer 5D, it becomes possible to completely prevent the fuel gas and the oxidant gas from flowing into the other manifolds from the respective manifolds after passing through the peripheral gap 40 of the main body portion of the film electrode assembly, without passing through the fuel gas flow passage 21 and the oxidant gas flow passage 31. Moreover, by forming the shape of the annular portions 7A into a shape to be fitted with the step differences 25 and 35 of the anode separator 2 and the cathode separator 3, no gap is formed between the film electrode assembly 1 and the anode separator 2 as well as the cathode separator 3, so that it becomes possible to prevent leakage of the fuel gas and the oxidant gas.

Moreover, since the gap filling portion 7B is filled into the gap of the electrode layer 5D, the fuel gas or the oxidant gas is prevented from making a shortcut by passing through the gap produced by a difference in size between the diffusion layer 5C and the catalyst layer 5B. By filling the gap with the gap filling portion 7B, the fuel gas or the oxidant gas is prevented from moving through the gap.

On the top face of each annular portion 7A of the gasket 7, a rib 7C is formed so as to extend along its elongated direction. In the assembled state of the cells 10, this rib 7C is pressed and squashed by the contacting separator. As a result, since the fastening force of the cells 10 concentrates on the portion of the rib 7C, the peripheral portions of the respective manifold holes 12, 13, 14 and the main body portion 5 of the film electrode assembly can be more positively sealed. That is, the fluids passing through the respective manifold holes 12, 13 and 14 are at high pressure, and by placing the rib 7C, the sealing property of the gasket 7 is ensured, so that the manifold holes 12, 13 and 14 are prevented from leakage.

It should be noted that a position B where the rib 7C is formed is placed near the center in comparison with the outer end A of the polymer electrolyte film 5A supported on the frame member 6. By thus placing the position of the rib 7C closer to the center, the pressing force is concentrated on the position where the polymer electrolyte film 5A is formed, so that the fuel gas or the oxidant gas is prevented from making a shortcut toward the opposing side face through the gap between the polymer electrolyte film 5A and the frame member 6.

As described above, the gap filling portion 7B corresponds to a portion filling the gap between the protruding portion of the diffusion layer 5C and the polymer electrolyte film 5A. The gap filling portion 7B is formed by allowing fused resin to enter the gap when the gasket 7 is molded by using an injection-molding process, as will be described later. For this reason, as will be described below, the protrusion width of the protruding portion of the diffusion layer 5C is preferably set to a predetermined value, as will be described later.

Figure 5B:
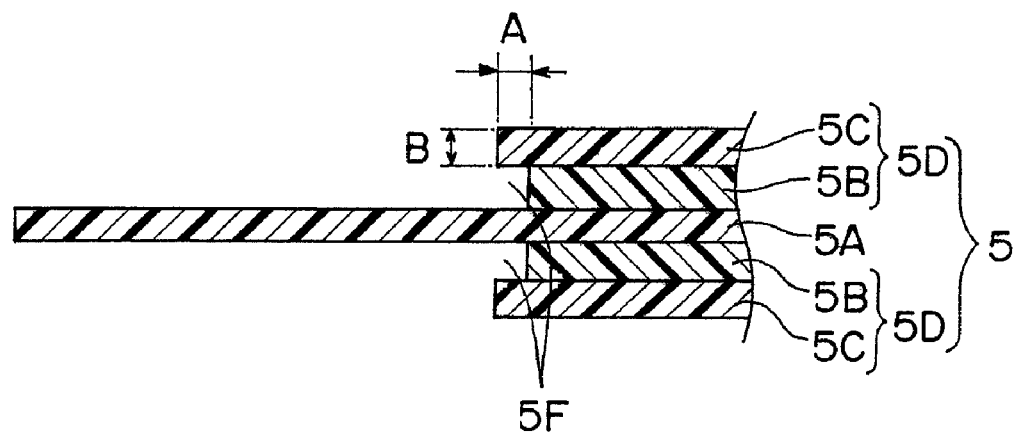
FIG. 5B is a partially enlarged cross-sectional view showing a structure of an electrode layer of the main body portion of the film electrode assembly.

A method for manufacturing the film electrode assembly 1 will be discussed in the following description. First, with respect to the main body portion 5 of the film electrode assembly, catalyst layers 5B are respectively formed in the center portions on the two faces of a polymer electrolyte film 5A, and a diffusion layer 5C is each formed thereon. In this case, the diffusion layer 5C is formed so as to protrude from the peripheral edge of the catalyst layer 5B. FIG. 5B is a partially enlarged cross-sectional view showing a structure of an electrode layer of the main body portion 5 of the film electrode assembly.

The catalyst layer 5B is formed, for example, as described below. Platinum is supported on KETJEN BLACK EC (Furnace black manufactured by KETJEN BLACK INTERNATIONAL CO.: specific surface area 800 m$^2$/g, DPB oil adsorption 360 ml/100 g) at a weight ratio of 1:1. Next, to 10 g of this catalyst powder are added 35 g of water and 59 g of an alcohol dispersion solution of hydrogen ion conductive polymer electrolyte (9% FSS, manufactured by Asahi Glass Co., Ltd.) to be mixed therein, and this is dispersed by using an ultrasonic stirrer to prepare a catalyst layer ink. This catalyst layer ink is spray-coated onto each of the two main faces of a polymer electrolyte film 5A to a thickness of 20 µm, and this is then subjected to heat treatment at 115° C. for 20 minutes to form a catalyst layer 5B. It should be noted that the spray-coating process is carried out with the polymer electrolyte film 5A being covered with a mask having an opening of 120 mm×120 mm. At this time, a perfluorocarbon sulfonic acid film (DUPONT Nafion 117®) having an outer shape dimension of 140 mm in square and a thickness of 50 µm is used as the polymer electrolyte film 5A.

Next, a diffusion layer 5C is formed on the catalyst layer 5B. The diffusion layer 5C is formed with a porous material having a number of fine pores. Thus, by allowing a fuel gas or an oxidant gas to enter the pores, the gas is dispersed to easily reach the catalyst layer 5B. In the present embodiment, a carbon fiber cloth of 123 mm (Carbel CL400, 400 μm in thickness, manufactured by JAPAN GORE-TEX CO., LTD.) is covered over each of the two main faces of the polymer electrolyte film 5A covered with the catalyst layer 5B. Then, by hot-pressing this carbon fiber cloth under pressure of 0.5 MPa at 135° C. for 5 minutes, a dispersion layer is formed in such a manner as to be joined onto each of the two main faces of the polymer electrolyte film 5A.

As shown in FIG. 5B, a protrusion width A of the diffusion layer 5C is desirably set to be smaller than the thickness width B of the diffusion layer 5C. By making the protrusion width A of the diffusion layer 5C smaller than the thickness width B of the diffusion layer 5C, it becomes easier to inject a thermoplastic elastomer to form a gasket 7 into a gap 5F formed below the diffusion layer 5C, in a forming process of the gasket, which will be described later (see FIG. 6D); thus a gap filling layer 7B is easily formed. That is, in the case where the protrusion width A is made larger, the depth to the farthest end of the gap 5F becomes larger, making it difficult to inject the thermoplastic elastomer up to the farthest end of the gap 5F. Moreover, the protruding portion of the diffusion layer is easily deflected toward the polymer electrolyte film 5A side by the injection pressure of the thermoplastic elastomer, with the result that the injection inlet of the thermoplastic elastomer of the gap 5F becomes smaller. Consequently, it becomes difficult to form the gap filling layer 7B.

Figure 5C:
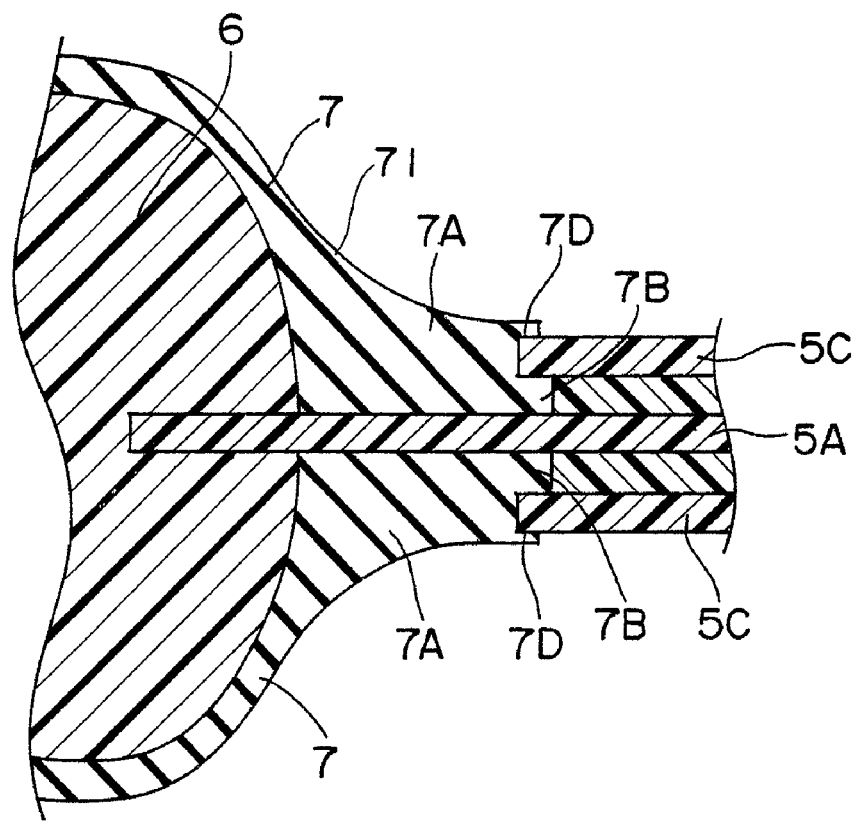
FIG. 5C is a partially enlarged cross-sectional view showing a structure of an electrode layer of a main body portion of a film electrode assembly in accordance with a modification.

As shown in FIG. 5C, the annular portion 7A of the gasket may be formed so that one portion thereof is covered on the surface of the diffusion layer 5C. This covering portion 7D is preferably formed only on the protruding portion of the diffusion layer 5A.

Next, a frame member 6 is formed on the peripheral edge portion 5E of the main body portion 5 of the film electrode assembly. FIGS. 6A to 6D are manufacturing process diagrams schematically showing each manufacturing process of the film electrode assembly on a cross-section taken along the line VI-VI of FIG. 3 and FIG. 4.

Figure 6A:
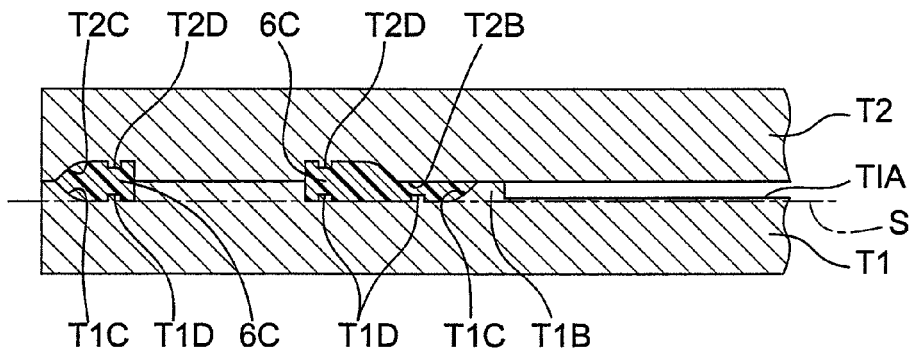
FIG. 6A, FIG. 6B, FIG. 6C, and FIG. 6D are manufacturing process diagrams schematically showing each manufacturing process of the film electrode assembly on a cross section taken along the line VI-VI of FIG. 3 and FIG. 4.

In the first process, a molded member 6C, which forms one portion of the frame member 6, is formed. As shown in FIG. 6A, after a first mold T1 and a second mold T2 have been coupled with each other, a thermoplastic resin for the molded member 6C, i.e. the frame member 6, is poured into the gap between the first mold T1 and the second mold T2 by an injecting process or the like to form the molded member 6C. The molded member 6C is provided with a flat portion 6C1 on which the peripheral edge portion 5E of the main body portion 5 of the film electrode assembly is formed along its frame inner edge.

The first mold T1 is designed so that a frame member portion T1C shall have the shape of the molded member 6C, that is, a shape corresponding to the shape of the lower half face of the frame member 6. Moreover, in the inner frame portion of the first mold T1, a flat portion T1B, which allows the peripheral edge portion 5E of the main body portion 5 of the film electrode assembly to be placed thereon, is formed. That is, the flat portion T1B has a top face that extends substantially in parallel with the molded member 6C, that is, the frame face S of the frame member 6, from the frame inner edge side of the frame member portion T1C. Moreover, a concave portion T1A, which houses the main body portion 5 of the film electrode assembly on its flat face to place it thereon, is formed on a portion inside the frame of the first mold T1. In other words, the concave portion T1A has an area that extends farther by about several millimeters than the outer edge of the diffusion layer 5C in the inner frame portion of the first mold T1 formed with the elongated top face of the flat portion T1B, and the bottom portion forms a flat face with a depth approximately corresponding to the thicknesses of the catalyst layer 5B and the diffusion layer 5C of the main body portion 5 of the film electrode assembly, based upon the top face of the flat portion T1B.

The second mold T2 is designed so that the frame member portion T2C molds the molded member 6C, that is, the upper half face of the frame member 6. Note that a flat portion T2B is formed on the frame inner edge portion of the second mold T2 so as to allow the peripheral edge portion 5E of the main body portion 5 of the film electrode assembly to be placed thereon. That is, the flat portion T2B has a top face that contacts the top face of the flat portion T1B of the first mold T1, and extends toward the frame outer edge beyond the area of the peripheral edge portion 5E of the film electrode assembly 1.

The frame member portions T1C and T2C are provided with convex portions T1D, T1D at such positions as to surround the installation positions of the gaskets 7, that is, the manifold holes 12, 13 and 14 and also surround the inside of the frame in the frame member 6. On the cross sections of the convex portions T1D and T2D, each depth is set to about 0.5 mm and each width is set to about 0.5 mm. With this arrangement, the groove portion 6A is molded on the molded member 6C, that is, on the frame member 6. It should be noted that the frame member portions T1C and T2C may be formed without the convex portions T1D and T2D, and after the frame member 6 has been formed, a cutting process may be performed to form the groove portion 6A.

Moreover, the frame member portions T1C and T2C have respective shapes that allow the manifold holes 12, 13 and 14 to be formed. Thus, the manifold holes 12, 13 and 14 can be formed through molding processes. It should be noted that the frame member portions T1C and T2C may be designed without the shapes of the manifold holes 12, 13 and 14, and the manifold holes 12, 13 and 14 may be formed by carrying out a cutting process or a punch-out process on the frame member 6.

Figure 6B:
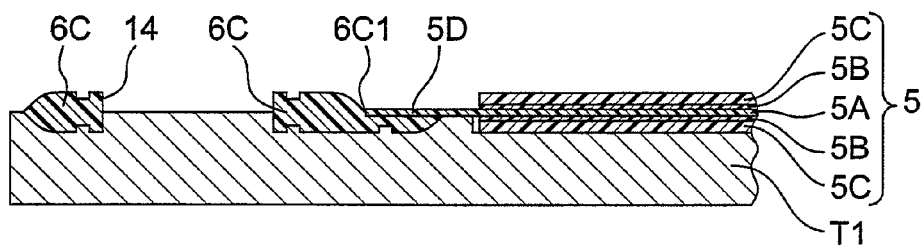

Next, in the second process, the second metal mold T2 is removed from the molded member 6C, and the main body portion 5 of the film electrode assembly is placed on a plane inside the frame of the molded member 6C fitted to the first mold T1, with the peripheral edge portion 5E of the main body portion 5 of the film electrode assembly being placed on the flat portion 6C1. More specifically, as shown in FIG. 6B, these portions are placed so as to allow the polymer electrolyte film 5A covered with the protective film 5D and placed so as to extend on the periphery of the main body portion 5B of the film electrode assembly to be placed on the flat portion 6C1 of the molded member 6C, and also allow the diffusion layer 5C to be placed on the concave portion T1A of the first mold T1. Thus, the main body portion 4 of the film electrode assembly is placed in a flat state.

Figure 6C:
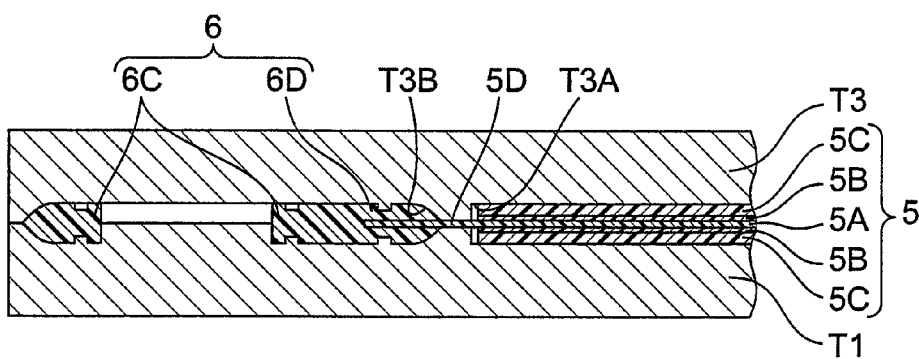

Then, in the third process, the frame member 6 to which the main body portion 5 of the film electrode assembly is joined is manufactured. More specifically, as shown in FIG. 6C, a third mold T3 is coupled to the first mold T1 to which the molded member 6C having the main body portion 5 of the film electrode assembly placed therein is fitted. In this case, in the same manner as in the first mold, the third mold T3 is provided with a concave portion T3A formed at a position interfered with the diffusion layer 5C so as not to make the diffusion layer 5C in contact with the third mold T3. In other words, the concave portion T3A has the same shape as that of the concave portion T1A. Thus, in the third process, since the third metal mold T3 and the diffusion layer 5C are prevented from interfering with each other, it becomes possible to prevent damages from occurring in the main body portion 5 of the film electrode assembly.

Then, a thermoplastic resin for the frame member 6 is poured into a gap between the first mold T1 and the third mold T3, that is, a main-body fixing portion 6D of the film electrode assembly, by an injection process or the like, so that a frame member 6 is molded integrally with the molded member 6C. Note that the third mold T3 is designed so that one portion of the flat portion 6C1 of the molded member 6C is formed into the shape of the upper half face of the frame member 6. That is, the main-body fixing portion 6D of the film electrode assembly is placed at a gap formed between the frame member portion 3B of the third mold T3 and the molded member 6C. Then, the peripheral edge portion 5E of the main body portion 5 of the film electrode assembly, placed on the flat portion 6C1 of the molded member 6C, is fused by the heat of the resin material poured thereto, and adheres to the gap between the main-body fixing portion 6D of the film electrode assembly and the flat portion 6C1 of the molded member 6C. Consequently, the main body portion 5 of the film electrode assembly is joined to the frame member 6.

Figure 6D:
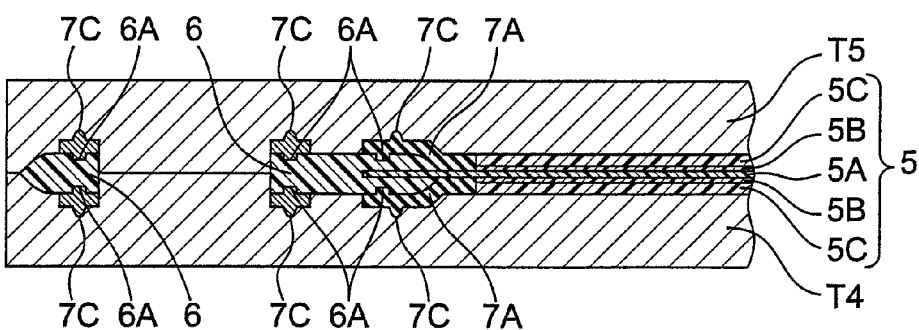

Furthermore, in the fourth process, a gasket 7 is formed on the frame member 6 to which the main body portion 5 of the film electrode assembly has been joined, so that a film electrode assembly 1 is manufactured. As shown in FIG. 6D, the frame member 6 joined with the main body portion 5 of the film electrode assembly is removed from the first mold T1 and the third mold T3, and is then placed between a fourth mold T4 and a fifth mold T5, and the two molds are closed. A thermoplastic resin or a thermoplastic elastomer for the gasket 7 is poured into a gap between the fourth mold T4 as well as the fifth mold T5 and the frame member 6 by an injection process or the like, so that a gasket 7 is formed on each of the two faces of the frame member 6. The fourth mold T4 and the fifth mold T5 are designed so that annular portions of the gasket can be molded. Also, an annular portion 7A of the gasket 7 is placed at a gap 40 between the inner edge of the frame member 6 and the electrode layer 5D formed on the main body portion 5 of the film electrode assembly, and upon injection of the thermoplastic elastomer which is fused resin into that portion, it is injected into the gap 5F between the diffusion layer 5C and the polymer electrolyte film 5A. Thus, a gap filling layer 7B is formed on that portion.

As described above, in the method for manufacturing the film electrode assembly 1 according to the present embodiment, except for the second process in which the main body portion 5 of the film electrode assembly is placed in the film electrode assembly 1, molding processes are carried out. Therefore, the film electrode assembly 1 is manufactured in a molding machine, and in the second process, a preliminarily manufactured main body portion 5 of the film electrode assembly only have to be carried into a molding machine and placed therein so that the manufacturing process is carried out. Therefore, the manufacturing method according to the present embodiment is suitably used for mass production of film electrode assemblies 1 with high efficiency in utilization of the fuel gas and the oxidant gas.

It should be noted that by using slide molds or rotary molds, processes from the first process to the third process may be continuously carried out in a single molding machine. This arrangement makes it possible to further simplify the processes, and consequently to further improve the mass productivity of film electrode assembly 1.

In order to form the gap filling layer 7B more easily, a modification of the electrode layer 5D for the main body portion 5 of the film electrode assembly will be given below.

Figure 7A:
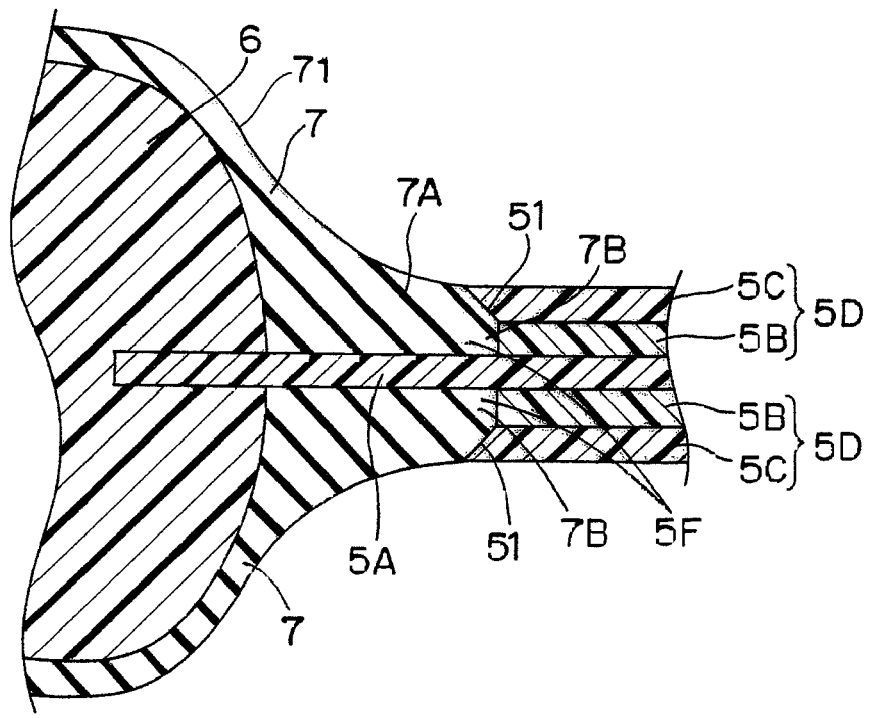
FIG. 7A is a partially enlarged cross-sectional view showing a film electrode assembly in accordance with the modification.

FIG. 7A is a partially enlarged cross-sectional view showing a film electrode assembly in accordance with the modification. In the modification, the diffusion layer 5C is designed to have a tapered shape at its end face 51. By forming the end face of the diffusion layer 5C into a tapered shape, the injection inlet for the fused resin into the gap 5F between the diffusion layer 5C and the polymer electrolyte film 5A is widened, so that the fused resin can be easily injected into that gap. Thus, the gap filling layer 7B is more easily formed.

Figure 7B:
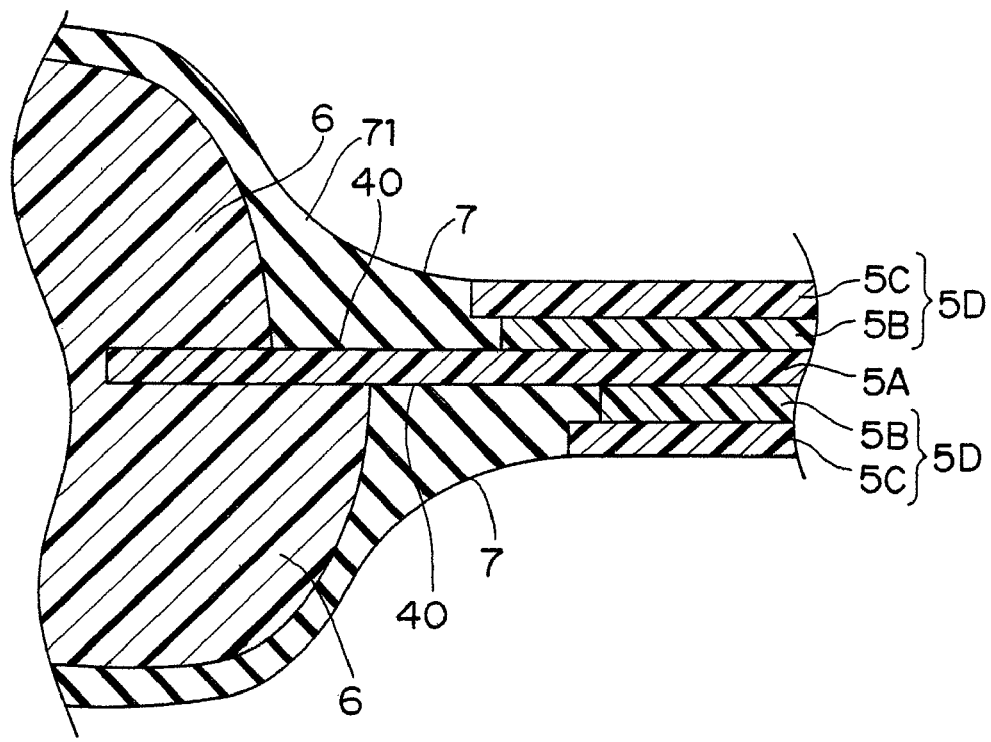
FIG. 7B is a partially enlarged cross-sectional view showing a film electrode assembly in accordance with another modification.

FIG. 7B is a partially enlarged cross-sectional view showing a film electrode assembly in accordance with another modification. In this modification, the positions of the electrode layers 5D are designed to be shifted from each other on the front surface and back surface of the polymer electrolyte film 5A. It should be noted that in this case also, the positions of the inner edges of the frame members 6 are changed on the front surface and back surface so that the widths of the peripheral gaps 40 of the main body portion of the film electrode assembly between the inner edge of the frame member 6 and the electrode layer 5D are made equal to each other on the front surface and back surface. By differentiating the positions of the electrode layers 7D between the front surface and back surface of the polymer electrolyte film 5A, it becomes possible to shift the positions at which pressure is applied to the polymer electrolyte film 5A even when the injection pressure of the fused resin is increased in molding the gaskets 7, and the damages to be inflicted on the polymer electrolyte film 5A can be reduced, thereby improving the yield.

It should be noted that the present invention is not limited by the above-described embodiments, and various modifications may be made thereto.

INDUSTRIAL APPLICABILITY

The present invention makes it possible to block flows of a fuel gas and an oxidant gas on an peripheral edge of a main body portion of a film electrode assembly, in an assembled state of a polymer electrolytic fuel cell, and consequently to enhance the efficiency in utilization of the fuel gas and the oxidant gas; therefore, the resulting fuel cell can be effectively adopted as a fuel cell used for a cogeneration system and an electric car.

It should be noted that the present invention is not limited by the above-described embodiments, and various modifications may be made thereto.

Moreover, by appropriately combining any of the embodiments among the above-described various embodiments, it becomes possible to obtain the respective effects.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A film electrode assembly for a fuel cell comprising:
   a main body portion of the film electrode assembly having a polymer electrolyte film and a pair of electrode layers, each pair of electrode layers being formed in a center area inside a peripheral edge portion of each of two surfaces of the polymer electrolyte film, each pair of electrode layers having a catalyst layer and a diffusion layer laminated, the diffusion layer having an area larger than that of the catalyst layer with a peripheral edge protruding from the catalyst layer, a gap being formed between the protruding portion of the diffusion layer and the peripheral edge portion of the polymer electrolyte film;

a frame member that sandwiches the peripheral edge portion of the polymer electrolyte film with a gap formed between the paired electrode layers, and is made of a plate-shaped thermoplastic resin in such a manner as to surround an outer edge of the polymer electrolyte film; and a gasket formed on each of the two faces of the frame member, the gasket being made of a thermoplastic resin, wherein the gasket includes an annular portion that is placed along an inner edge of the frame member, and covers the gap from the inner edge of the frame member, a rib formed on the annular portion and extending along the inner edge of the frame member, and a gap filling portion for filling the gap between the protruding portion of the diffusion layer and the peripheral edge portion of the polymer electrolyte film.

2. The film electrode assembly for a fuel cell according to claim 1, wherein the position where the elongated rib is formed along the inner edge of the frame member is located on an inner side from an outer peripheral end of the polymer electrolyte film sandwiched by the frame member.

3. The film electrode assembly for a fuel cell according to claim 1, wherein the protruding portion of the diffusion layer has a protrusion width smaller than the thickness width of the diffusion layer.

4. The film electrode assembly for a fuel cell according to claim 1, wherein, in the diffusion layer, an end face of the protruding portion is formed into a tapered shape in a direction in which the catalyst layer side is shortened.

5. The film electrode assembly for a fuel cell according to claim 1, wherein the electrode layers, each formed on the two surfaces of the polymer electrolyte film, are placed at positions shifted from each other on the front surface and back surface, with the positions of the gaps being different in the front surface direction and back surface direction.

6. The film electrode assembly for a fuel cell according to claim 1, wherein the frame member includes a pair of manifold holes for respectively supplying a fuel gas and an oxidant gas to the main body portion of the film electrode assembly, and the annular portions of the gasket are placed on the peripheral portions of the pair of the manifold holes.

7. A polymer electrolytic fuel cell comprising:
a film electrode assembly of claim 1; and
an anode separator and a cathode separator, each being placed to sandwich the film electrode assembly,
wherein the anode separator and the cathode separator are formed such that annular-portion contacting portions to be in contact with annular portions formed on the periphery of the main body portion of the film electrode assembly are formed into the same shapes as those of the outer shapes of the annular portions, and no gap is formed between the annular portions and the annular-portion contacting portions.

8. A polymer electrolytic fuel cell comprising more than one laminated polymer electrolytic fuel cells of claim 7.

9. A method for manufacturing a film electrode assembly comprising:

forming catalyst layers on two surfaces of a polymer electrolyte film on an inner side from a peripheral edge portion of the polymer electrolyte film, and placing a diffusion layer on each of the surfaces of the catalyst layer in a laminated state, the diffusion layer having an area larger than the catalyst layer with a peripheral edge protruding from the catalyst layer, to manufacture a main body portion of the film electrode assembly with a gap being formed between the protruding portion of the diffusion layer and the peripheral edge portion of the polymer electrolyte film;

forming a molded member having a frame shape with a flat portion formed on a frame inner edge, by pouring a thermoplastic resin between a first mold and a second mold;

coupling a third mold to the first mold to which the molded member is fitted, the molded member having the main body portion of the film electrode assembly placed inside the frame of the molded member, such that the peripheral edge portion of the main body portion of the film electrode assembly is positioned on the flat portion, and pouring a thermoplastic resin between the first mold and the third mold to mold a frame member to which the main body portion of the film electrode assembly is joined;

coupling a fourth mold and a fifth mold to each other while sandwiching the frame member to which the main body portion of the film electrode assembly is joined therebetween, and pouring a fused resin between the fourth mold and the fifth mold to mold a gasket, the gasket including an annular portion that is formed along the inner edge of the frame member and covers the frame member from the inner edge of the frame member to the outer edge of the diffusion layer, a rib that is provided on the annular portion and extends along the inner edge of the frame member, and a gap filling portion to fill the gap between the protruding portion of the diffusion layer and the peripheral edge portion of the polymer electrolyte film.

* * * * *